United States Patent

[11] 3,545,401

[72] Inventor Beaumont J. Davies
 Putnoe, England
[21] Appl. No. 706,242
[22] Filed Feb. 19, 1968
[45] Patented Dec. 8, 1970
[73] Assignee George Richards & Company Limited
 Broadheath, Altrincham, Cheshire,
 England
 a company of Great Britain
[32] Priority Feb. 21, 1967
[33] Great Britain
[31] No. 8119/67

[54] SCALE CONVERSION DEVICE
 10 Claims, 4 Drawing Figs.
[52] U.S. Cl. .................................................... 116/115.5,
 33/166
[51] Int. Cl. ...................................................... B23q 17/00
[50] Field of Search ........................................... 116/115,
 115.5, 133, 129; 74/10, 813, (Inquired); 33/166;
 82/(Inquired)

[56] References Cited
UNITED STATES PATENTS
| | | | |
|---|---|---|---|
| 1,027,549 | 5/1912 | Kronert | 33/166 |
| 2,958,136 | 11/1960 | Anderson | 33/166 |
| 3,198,165 | 8/1965 | Leonard | 116/115.5 |
| 3,315,633 | 4/1967 | Rabinow | 116/115.5 |
| 3,418,965 | 12/1968 | Rabinow | 116/115.5 |
| 1,155,440 | 10/1915 | Rebelski | 33/166 |

Primary Examiner—Louis J. Capozi
Attorney—Holcombe, Wetherill and Brisebois

ABSTRACT: This invention is a device for fitting to machine tools enabling graduations in inches to be converted into graduations on the metric system by use of a belt which runs over the drum carrying the inch graduations as a pulley.

INVENTOR
BEAUMONT J. DAVIES

3,545,401

SCALE CONVERSION DEVICE

The invention is concerned with a device for converting measurements in one system of units to measurements in another system. Such a device may for example be used to enable a metric dial indicator to be obtained from a machine tool fitted with lead screws in which the pitches are measured in inches.

According to the present invention a device for converting measurements in a first system of units to measurements in a second system consists of a cylinder carrying around it graduations each representing measurements in one system of units, the cylinder acting as a pulley for driving a belt carrying graduation representing corresponding measurements in the second system of units.

Preferably the belt is mounted on a sprocket on the cylinder to prevent slipping and to prevent cumulative errors in the belt length. The belt length is conveniently chosen to represent a whole number of units in the second system. This belt length may be taken up by pulleys and one of them could be arranged to drive a decade counter. An optical reading device operating in conjunction with the belt and second scale can provide a decimal read out.

Such a device is inexpensive to produce and requires only a simple modification to a standard scale marked with the first system and is more trouble free at high speeds than devices for similar purposes which involve meshing gear wheels. Speeds representing a linear pitch movement of a lead screw of 2 inches per second have been satisfactorily achieved.

The invention may be carried into practice in various ways and one embodiment will now be described by way of example with reference to the accompanying drawing in which.

Figure 1:
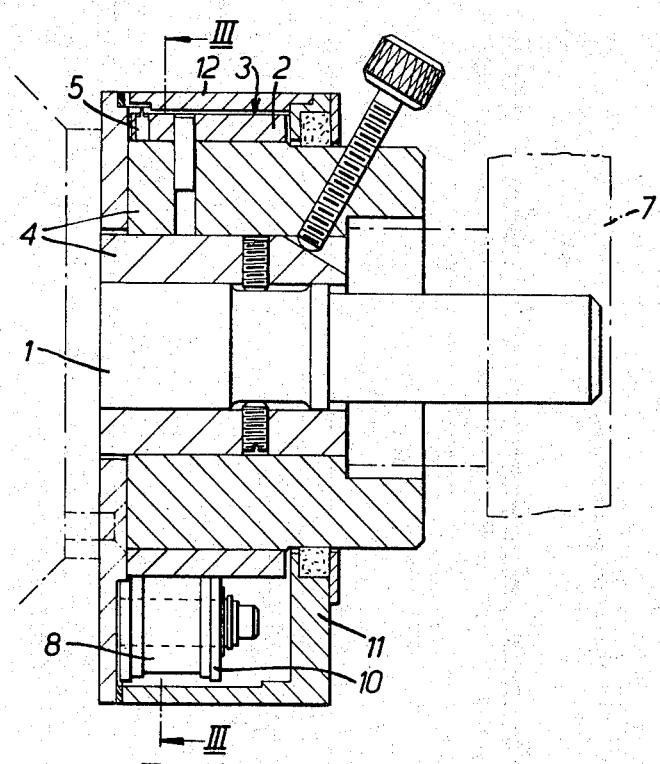
FIG. 1 is a sectional elevation of a conversion device applied to a lead screw of a machine tool.
Figure 2:
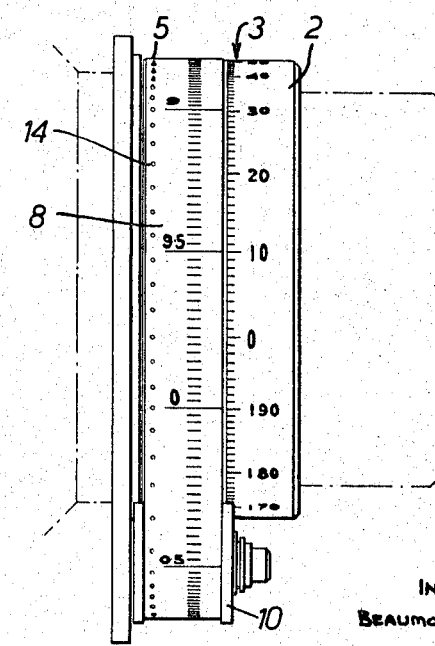
FIG. 2 is a view of the device with the cover removed and showing the scales.

A lead screw 1 having a pitch of 0.2 inches carries a calibrated cylinder 2 with a circumferential scale 3 having 200 divisions, with every tenth division bearing an identifying number. Thus the circumference of the cylinder will represent a linear movement of 0.2 inches, and each division will be equivalent to 0.001 inches of movement by the lead screw. The lead screw position can be determined in inches by a fixed reference line 6, or possibly by a vernier device. The cylinder 2 has a large central hole which is useful for accommodating a great variety of standard shafts by use of suitable adapters 4. A handwheel 7 enables the lead screw 1 to be turned by hand.

The cylinder 2 also carries 127 sprocket teeth 5 for driving a belt 8, which also passes under the reference line 6.

The belt 8 for example of terylene ultrasonically welded from strip after numerals and scale divisions 9 have been photographically applied from a master—is 250 sprocket holes long (i.e. with a total length of belt representing 10 mm). The sprocket holes may be punched in it before application of the markings. The belt 8 is nearly twice as long as the circumference of the cylinder 2 and the additional length is taken up by three pulleys 10, from which a decade counter may be driven if required. The pulleys are out away as shown except at each end, to save wear on the markings. The cylinder also could be out away between the edges of the belt.

Figure 3:
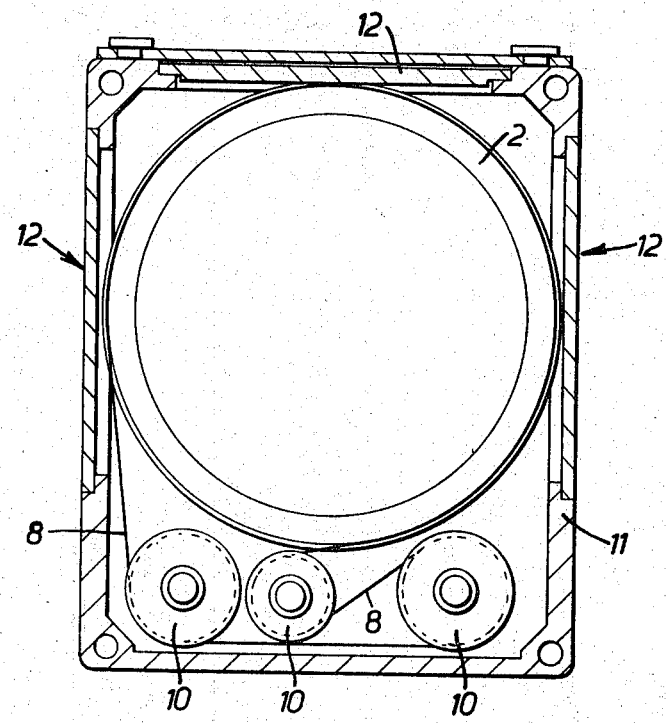
FIG. 3 is a section on the line III–III in FIG. 1 but with some components not shown.
Figure 4:
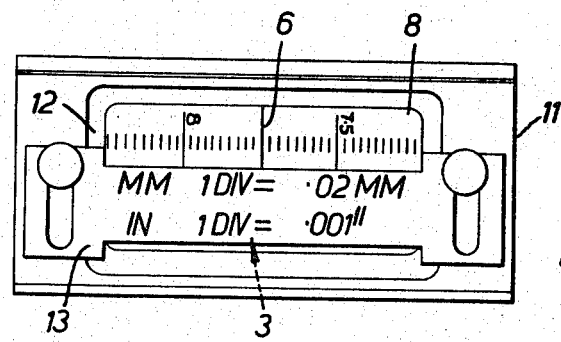
FIG. 4 is a plan view showing the appearance to a user.

In some cases it may be satisfactory to omit teeth from some of the 127 positions on the drum. The teeth left should be approximately evenly spaced. The belt and pulley system is mounted in a casing 11 with a transparent window 12 through which to view the scale, and a shutter 13 can be set over the window 12 to mark the scale 3 or 9 which is not being used. The window 12 can be mounted in any of the three positions shown in FIG. 3 as is most convenient for the particular machine.

The cylinder 2 can be rotated and locked with respect to the lead screw 1 for datum setting.

In an alternative arrangement, the millimetre graduation could be carried without identifying numerals on the cylinder 2, and the numerals could move with the belt to identify the graduations in any position. This is very accurate because the graduations are on the same member, but the arrangement shown in the drawings does not produce cumulative errors because of the sprocket drive and the manufacture is simplified because all additional markings can be photographically applied to the belt in the flat.

The device can be designed for lead screws of any pitch. For lead screws with a pitch in the inch system, the sprocket contains 127 teeth or a multiple of 127, but the scale 9 may contain any number of divisions, possibly 508, each representing 0.01 mm. The length of the belt will be normally chosen to give a length representing an integral number of identical lengths representing for example 1 mm., 10 mm., or 100 mm. sections. The length is chosen to give the most convenient numbering.

The sprocket 5 prevents slipping of the belt and eliminates small cumulative errors in belt length, and the system is simple, cheaper, and more accurate than gearing for driving a millimetre cylinder from an inch cylinder.

For lead screws with a pitch in the metric system that require conversion to give a reading in inches, there would be 25, 50 or 100 sprocket teeth.

The following Tables 1 and 2 show examples of the design of the unit for inch and metric system screws respectively. The example in the specification is the second one in Table 1.

In Table 1, $Y/X = Z/25.4A$
In Table 2, $Y/X = 25.4 Z/A$ where A, X, Y, Z are the values in the columns identified by those letters.

TABLE 1.—INCH TO METRIC
Examples of possible arrangements

| Lead screw pitch, ins. | No. of divs. in metric scale if scale is on drum | No. of divs. in metric scale if scale is on belt | Each div. of metric scales represents mm. | No. of teeth on sprocket and heel | No. of sprocket holes in belt | Belt calibration |
|---|---|---|---|---|---|---|
| A | | | | X | Y | Z |
| .1 | 254 | 300 | .01 | 127 | 150 | 0 to 1 mm. three times. |
| .2 | 254 | 500 | .02 | 127 | 250 | 0 to 10 mm. |
| .2 | 254 | 300 | .02 | 127 | 150 | 0 to 1 mm. six times. |
| .25 | 127 | 200 | .05 | 127 | 200 | 0 to 10 mm. |
| .5 | 127 | 100 | .1 | 127 | 200 | 0 to 10 mm. two times. |

TABLE 2.—METRIC TO INCH

Examples of possible arrangements

| Lead screw pitch, mm. | No. of divs. in inch scale on belt | Each div. of inch scale represents in. | No. of teeth on sprocket wheel | No. of sprocket holes in belt | Belt calibration |
|---|---|---|---|---|---|
| A | | | X | Y | Z |
| 1 | 500 | .0002 | 50 | 127 | 0 to 0.1 in. |
| 1 | 500 | .0001 | 100 | 127 | 0 to 0.05 in. |
| 5 | 250 | .002 | 50 | 127 | 0 to 0.5 in. |
| 5 | 500 | .002 | 25 | 127 | 0 to 1.0 in. |
| 5 | 250 | .001 | 100 | 127 | 0 to 0.25 in. |
| 10 | 500 | .002 | 50 | 127 | 0 to 1 in. |
| 10 | 250 | .002 | 100 | 127 | 0 to 0.5 in. |
| 20 | 400 | .005 | 50 | 127 | 0 to 2 in. |
| 20 | 200 | .005 | 100 | 127 | 0 to 1 in. |

Note that in this case the inch scale should be on the belt.

I claim:

1. A device for converting measurements in a first system of units to measurements in a second system of units comprising a cylinder having a principal axis, and carrying on a circumferential surface thereof graduations representing measurements in one system of units, mounting means on which said cylinder is mounted for rotation about said axis, belt driving means rotatable with said cylinder, a flexible belt carrying graduations representing corresponding measurements in the second system of units and driven by said driving means in a path encircling said cylinder, in the course of which path said belt passes over a part of said peripheral surface adjacent the graduations on said cylinder, and is constrained by said driving means to travel with said part of said cylinder surface as said cylinder turns.

2. A device as claimed in claim 1 in which driving means is a sprocket drive.

3. A device as claimed in claim 2 including sprocket teeth on the cylinder and sprocket holes in the belt.

4. A device as claimed in claim 1 in which the belt length is equivalent to a whole number of units of the second system.

5. A device as claimed in claim 1 including a system of pulleys in which the belt runs around the cylinder and the system of pulleys.

6. A device as claimed in claim 1 including an optical arrangement enabling a measurement to be read on either system of units.

7. A device as claimed in claim 1 in which the ratio of the length of the belt to the circumference of the cylinder is equal to the ratio of the measurement on the second system corresponding to the full length of the belt to the measurement on the first system corresponding to the circumference of the cylinder, multiplied by a factor relating the two systems of units.

8. A device as claimed in claim 1 in which the cylinder also carries graduations in the second system of units while the belt carries markings for identifying these graduations.

9. A device as claimed in claim 1 which the belt carries graduations in the second system of units and markings identifying them.

10. A device as claimed in claim 1 including a lead screw of a machine tool the pitch of which is indicated by the graduations in the first system of units on the whole circumference of the cylinder, the cylinder being mounted on the lead screw.